(12) United States Patent
Huang et al.

(10) Patent No.: US 10,916,006 B2
(45) Date of Patent: Feb. 9, 2021

(54) RECOGNITION METHOD OF PATTERN FEATURE

(71) Applicant: Winbond Electronics Corp., Taichung (TW)

(72) Inventors: Ching-Ya Huang, Taichung (TW); Tso-Hua Hung, Taichung (TW)

(73) Assignee: Winbond Electronics Corp., Taichung (TW)

( * ) Notice: Subject to any disclaimer, the term of this patent is extended or adjusted under 35 U.S.C. 154(b) by 50 days.

(21) Appl. No.: 16/386,216

(22) Filed: Apr. 16, 2019

(65) Prior Publication Data
US 2020/0334799 A1    Oct. 22, 2020

(51) Int. Cl.
| | |
|---|---|
| *G06T 7/00* | (2017.01) |
| *G06T 7/50* | (2017.01) |
| *G06K 9/62* | (2006.01) |
| *G06T 7/66* | (2017.01) |

(52) U.S. Cl.
CPC ............. *G06T 7/001* (2013.01); *G06K 9/628* (2013.01); *G06K 9/6215* (2013.01); *G06K 9/6261* (2013.01); *G06T 7/50* (2017.01); *G06T 7/66* (2017.01); *G06T 2207/10061* (2013.01); *G06T 2207/30148* (2013.01)

(58) Field of Classification Search
CPC .................................. G06T 7/001; G06T 7/50
See application file for complete search history.

(56) References Cited

U.S. PATENT DOCUMENTS

| | | | | |
|---|---|---|---|---|
| 2015/0063713 A1* | 3/2015 | Yang | ..................... | G06K 9/4671 382/225 |
| 2017/0030712 A1* | 2/2017 | Hasumi | ................... | H01J 37/28 |
| 2017/0357911 A1 | 12/2017 | Liu et al. | | |

FOREIGN PATENT DOCUMENTS

| | | |
|---|---|---|
| CN | 1547762 | 11/2004 |
| TW | 201602565 | 1/2016 |
| TW | 201629905 | 8/2016 |

OTHER PUBLICATIONS

"Office Action of Taiwan Counterpart Application," dated Dec. 19, 2019, p. 1-p. 6.

* cited by examiner

*Primary Examiner* — Tuan H Nguyen
(74) *Attorney, Agent, or Firm* — JCIPRNET

(57) ABSTRACT

A recognition method of pattern feature is provided, where a recognition result thereof is applied to optical proximity correction, the method includes: providing a plurality of reference images with a reference pattern feature; recognizing and classifying the reference images by an image recognition device, and storing the recognition result; comparing the image with the actual pattern feature with the stored recognition result by the image recognition device to recognize and classify the image with the actual pattern feature; and calculating an angle feature value and/or a distance feature value of the actual pattern feature by the image recognition device according to a classification result to obtain the recognition result of the pattern feature.

7 Claims, 5 Drawing Sheets

310

300

RECOGNITION METHOD OF PATTERN FEATURE

BACKGROUND

Technical Field

The invention relates to a recognition method of pattern feature where a recognition result is adapted to be applied to optical proximity correction (OPC).

Description of Related Art

In a semiconductor component manufacturing process, the minimum line width is usually referred to as a critical dimension (CD). Along with miniaturization of design rules and the critical dimension, a pattern design with a special tilt angle or a wiggle shape is sometimes required for layout. Moreover, limited by a lithography process and an etching process, optical proximity correction (OPC) is usually adopted to correct an optical mask pattern to form a precise pattern.

Presently, before the OPC is performed, a manual method is generally adopted to measure pattern feature values (such as a pattern wiggle angle, a distance between adjacent patterns, etc.) of a pattern image obtained by a Scanning Electron Microscope (SEM). Then, the measured feature values are applied to OPC to serve as compensation values, so as to produce an optical mask having a precise pattern.

However, to measure pattern feature values through the manual method is time-consuming and is easy to have a subjective judgment error, thus affecting accuracy of the finally formed pattern.

SUMMARY

The invention is directed to a recognition method of pattern feature, which adopts an image recognition device to obtain a recognition result of the pattern feature.

The invention provides a recognition method of pattern feature, where a recognition result thereof is applied to optical proximity correction, and the recognition method of pattern feature includes: providing a plurality of reference images with a reference pattern feature; recognizing and classifying the reference images by an image recognition device, and storing the recognition result; comparing an image with an actual pattern feature with the stored recognition result by the image recognition device to recognize and classify the image with the actual pattern feature; and calculating an angle feature value and/or a distance feature value of the actual pattern feature by the image recognition device according to a classification result to obtain the recognition result of the pattern feature.

Based on the above description, in the invention, by using the image recognition device to obtain the recognition result of the pattern feature, occurrence of a subjective judgment error is avoided. Moreover, by using the image recognition device to compare and classify the image with the actual pattern feature, a plurality of angle feature values and/or distance feature values in the image may be calculated all-at-once, so as to effectively improve efficiency of the semiconductor component manufacturing process.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the specification, the so-called "pattern feature" refers to an angle of a wiggle shape pattern and/or a distance between adjacent patterns. For example, the angle of the wiggle shape pattern is an angle presented by a turning point (a vertex) of the wiggle shape pattern, which may be an obtuse angle, a right angle or an acute angle. Moreover, a recognition result of the pattern feature may be, for example, applied to calculate compensation values required by optical proximity correction (OPC).

Figure 1:
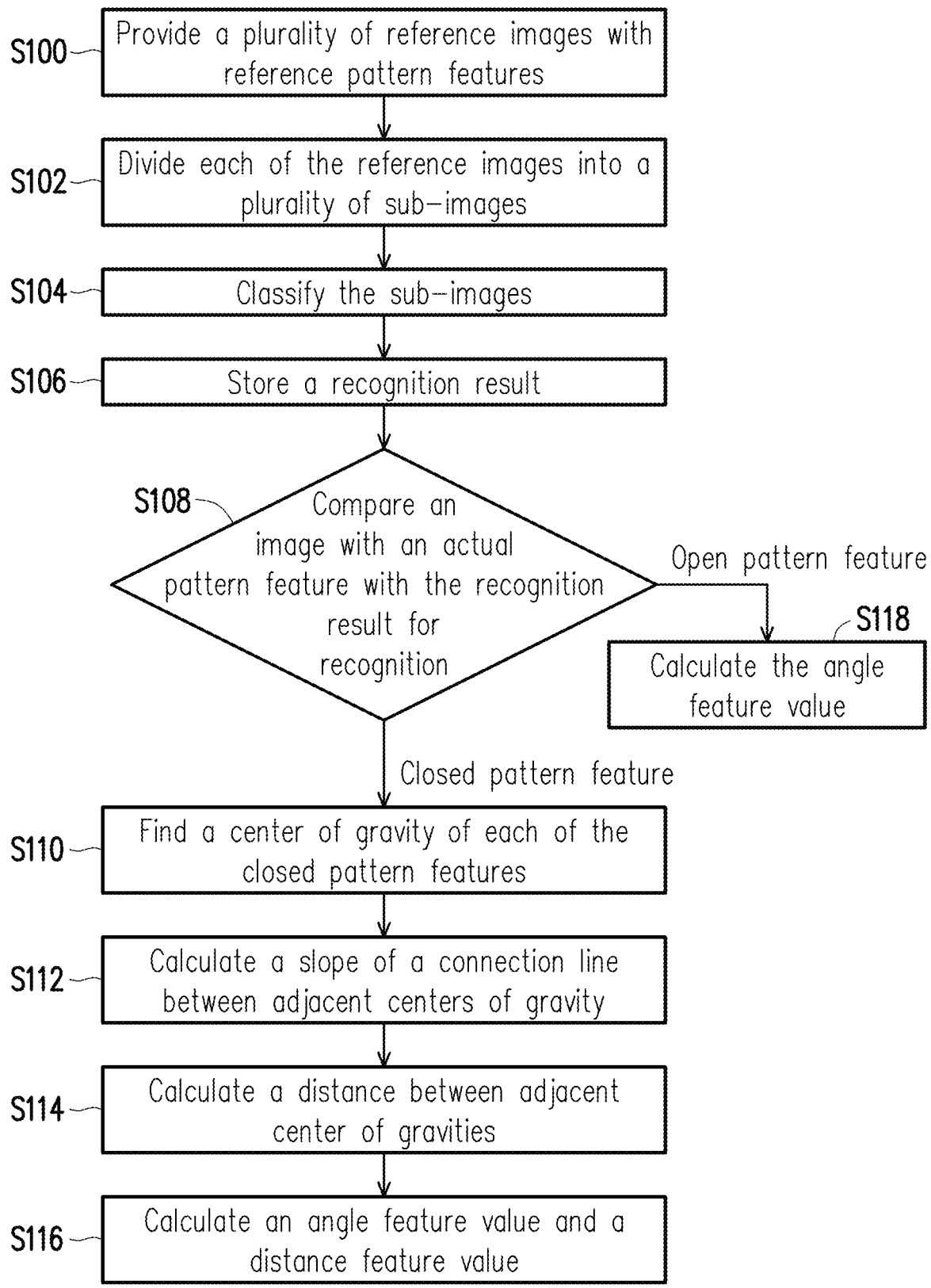
FIG. 1 is a flowchart illustrating a recognition method of pattern feature according to an embodiment of the invention.

FIG. 1 is a flowchart illustrating a recognition method of pattern feature according to an embodiment of the invention.

Referring to FIG. 1, in a step S100, a plurality of reference images with reference pattern features is provided. In the embodiment, the so-called "reference pattern feature" is a shallow trench isolation (STI) pattern, a hole pattern required to form a contact or a wire pattern required for circuit design in the existing component, though the invention is not limited thereto. In the embodiment, the reference images are images of an existing component captured by a scanning electron microscope (SEM), where the SEM is, for example, a critical dimension (CD) SEM.

Figure 2:
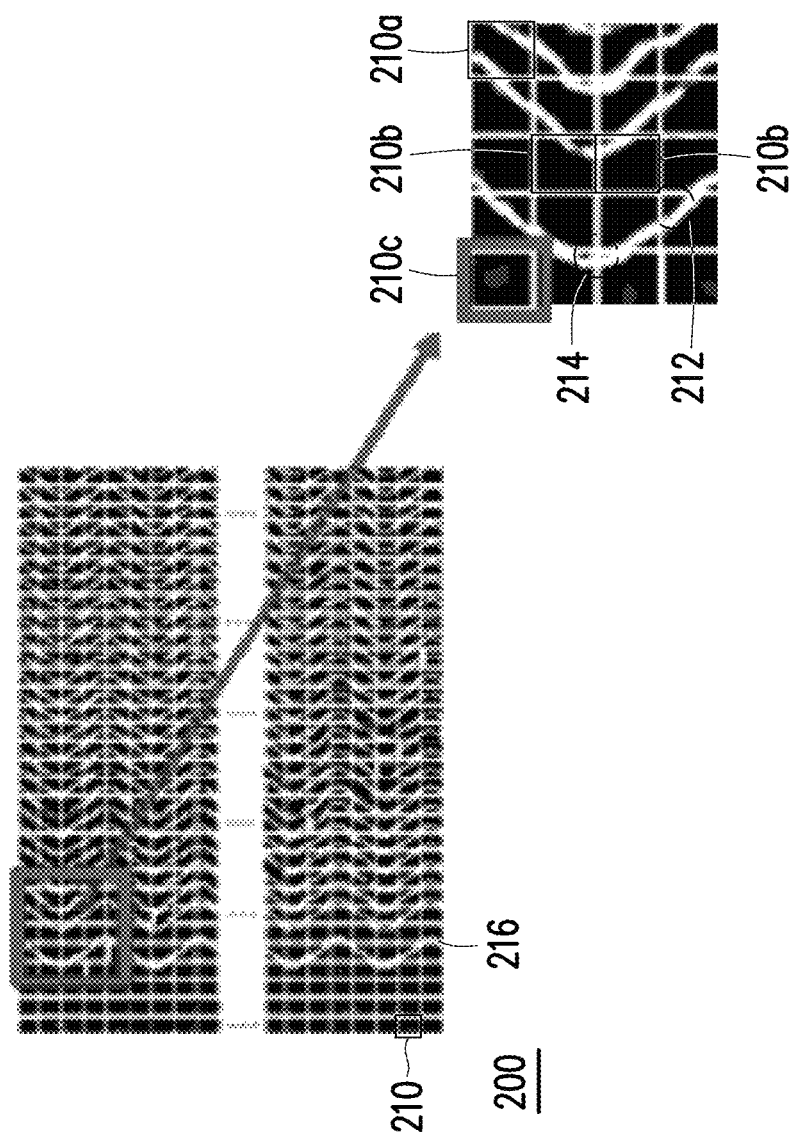
FIG. 2 is a divided scanning electron microscope (SEM) photograph of a reference image.

Then, a step S102 is executed, by which the reference images are provided to an image recognition device. During a process of image recognition, the image recognition device divides each of the reference images into a plurality of sub-images. Generally, a dimension of a SEM photograph is, for example, 960×960 pixels. Therefore, in the embodiment, taking a reference image 200 of 960×960 pixels as an example, the image recognition device divides the reference image 200 in a unit of 10×10 pixels to obtain 96×96 sub-images 210, as shown in FIG. 2. In this way, the image recognition device may recognize and classify one of the sub-images 210 to implement the subsequent recognition step.

Generally, in the SEM photograph, due to a surface structure difference of the semiconductor component, a secondary electronic signal received by the SEM is changed, so that a white all is produced at a region with the unevenness of the secondary electronic signal. In the embodiment, as shown in FIG. 2, the white wall 216 of the reference image 200 presents a curved wavy pattern, and the white wall 216 includes a boundary 212 and a vertex 214, where the vertex 214 is a turning point of the curved wavy pattern, and the boundary 212 is located between two adjacent vertexes 214. After the division, the reference image 200 includes a sub-image 210a containing the boundary 212, a sub-image 210b containing the vertex 214 and other sub-images 210c.

Then, a step S104 is executed, by which the image recognition device classifies the sub-images containing the boundaries or vertexes of the reference pattern feature into a first category and classifies the other sub-images into a second category. In the embodiment, the image recognition device classifies the sub-image 210a and the sub-image 210b into the first category, and classifies the sub-image 210c into the second category. In the embodiment, the second category is considered as image noise and is not referenced. In other words, in the subsequent recognition step, the first category of the sub-images is mainly used as an analysis basis for pattern feature recognition. In the embodiment, the image recognition device, for example, adopts a K-means cluster algorithm to perform the aforementioned image recognition and classification.

Then, in a step S106, a recognition result is stored. To be specific, after the reference image 200 is recognized and classified through the above step, the recognition result (including a classification result) is stored. Therefore, the subsequent recognition step may be performed according to the aforementioned sub-images 210 of the first category and the second category, so as to replace subjective judgment of engineers to avoid occurrence of a subjective judgment error.

Then, in a step S108, an image with an actual pattern feature is compared with the stored recognition result for recognition. In the embodiment, the so-called "actual pattern feature" is similar to the aforementioned reference pattern feature, which may be a STI pattern, an opening pattern required to form a contact or a wire pattern required for circuit design in an actual component, though the invention is not limited thereto. In the embodiment, the image with the actual pattern feature, for example, includes an image of the actual component captured by the SEM, where the SEM is, for example, the CD-SEM.

In the above step, the image recognition device compares the image with the actual pattern feature and the sub-images of the first category, i.e. to fit the boundaries or vertexes of the sub-images of the first category in the recognition result stored in the step S106 with the image with the actual pattern feature.

Then, the image with the actual pattern feature is recognized according to the fitting result of the image with the actual pattern feature to classify the image with the actual pattern feature that has closed pattern features to a first category image, and classify the image with the actual pattern feature that has open pattern features to a second category image. For example, if the image with the actual pattern feature presents a closed pattern such as a square, a circle, etc., the actual pattern feature is considered as the closed pattern feature; conversely, the actual pattern feature is considered as the open pattern feature. In the embodiment, the closed pattern feature is a hole pattern or an opening pattern, and the open pattern feature is a wire pattern. Then, the image recognition device calculates an angle feature value and/or a distance feature value of the actual pattern feature according to a classification result to obtain the recognition result of the pattern feature. The angle feature value and the distance feature value are defined in detail below.

In the following description, calculation of the angle feature value and the distance feature value of the actual pattern feature in the first category image and the second category image are respectively described below.

If the image with the actual pattern feature is classified to the first category image, following steps are executed to calculate the angle feature value and the distance feature value of the actual pattern feature.

Figure 3A:
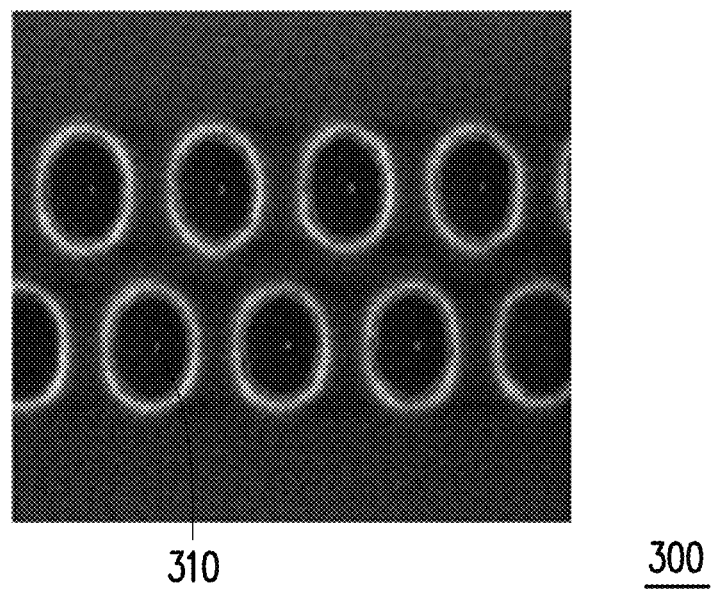
FIG. 3A is a SEM photograph of a first category image.

Referring to FIG. 1 and FIG. 3A, a step S110 is executed to find a center of gravity of each of the closed pattern features. For example, a calculation unit in the image recognition device or a calculation unit externally connected to the image recognition device may be adopted to find a center of gravity 310 of each of the closed pattern features in the first category image 300, though the invention is not limited thereto. In the embodiment, the closed pattern features in the first category image 300, for example, present oval patterns, and each of the oval patterns is, for example, arranged in an interleaving manner. In other embodiments, the closed pattern features may also present circle patterns, square patterns, etc., or arranged in different manners, which are not limited by the invention.

Figure 3B:
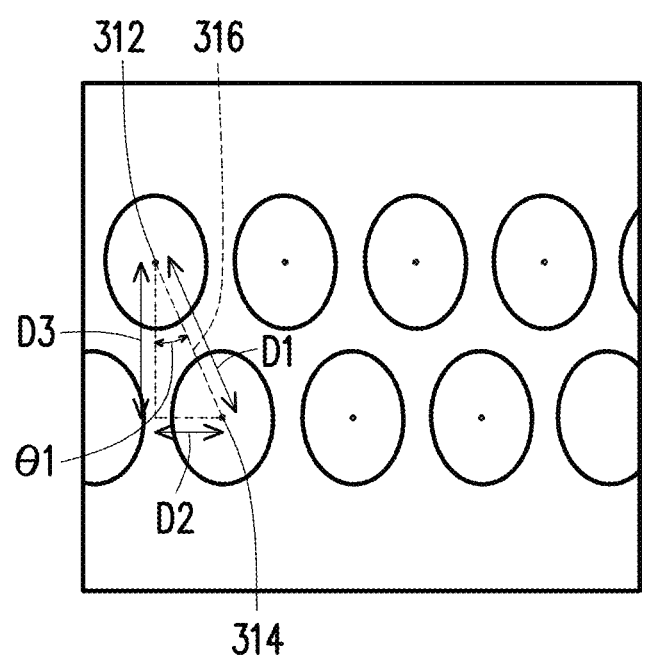
FIG. 3B is a schematic diagram of the first category image.

Referring to FIG. 1 and FIG. 3B, a step S112 is executed to calculate a slope of a connection line between centers of gravity of two adjacent closed pattern features. In the embodiment, a center of gravity 312 and a center of gravity 314 arranged in interleaving and located adjacent to each other are connected to obtain a connection line 316 as shown in FIG. 3B, and the aforementioned calculation unit is adopted to calculate the slope of the connection line 316. Moreover, the closed pattern features are classified based on the calculated slope of the connection line 316. For example, if the slope of the connection line 316 is greater than 0, the closed pattern feature with the center of gravity 312 and the closed pattern feature with the center of gravity 314 are classified to the first group; if the slope of the connection line 316 is smaller than or equal to 0, the closed pattern feature with the center of gravity 312 and the closed pattern feature with the center of gravity 314 are classified to the second group. Namely, the two adjacent closed pattern features with the slope of the connection line greater than 0 are classified to the first group, and the two adjacent closed pattern features with the slope of the connection line smaller than or equal to 0 are classified to the second group.

Then, the first group or the second group is selected to calculate the feature values of the subsequent step to avoid repeat calculation. For example, in the first group or the second group, by selecting slope of the connection line do not exceed a certain threshold to calculate the feature values, a calculation error is reduced. In an embodiment, the certain threshold is 0.01, though the invention is not limited thereto. In the embodiment, as shown in FIG. 3B, the two adjacent closed pattern features with the slope of the connection line smaller than 0 are selected, i.e. the second group is selected to perform the calculation.

Then, a step S114 is executed to calculate a distance between the centers of gravity of the two adjacent closed pattern features. In the embodiment, as shown in FIG. 3B, the calculation unit calculates a length of the connection line 316, i.e. a distance D1 between the center of gravity 312 and the center of gravity 314.

Then, a step S116 is executed to calculate an angle feature value θ1 and distance feature values D2 and D3 according to the distance D1. In the embodiment, the calculation unit is adopted to calculate the angle feature value θ1 of the two adjacent closed pattern features, and obtain the distance feature values D2 and D3 according to an anti-trigonometric function based on the aforementioned calculated distance D1 between the center of gravity 312 and the center of gravity 314 and the angle feature value θ1. In the embodiment, the distance feature value D2 is substantially equal to a horizontal distance between the center of gravity 312 and the center of gravity 314, and the distance feature value D3 is substantially equal to a vertical distance between the center of gravity 312 and the center of gravity 314. In other words, the distance D1 and the distance feature values D2 and D3 are substantially side lengths of three sides constituting a right triangle, and the angle feature value θ1 is, for example, one of an included angle in the right triangle. In the embodiment, the angle feature value θ1 and the distance feature values D2 and D3 are the recognition result of the pattern feature adapted to be applied to the OPC.

The above is a convenient description, which is an example of calculating a set of angle feature value and distance feature values. In other embodiments, the image recognition device may simultaneously calculate a plurality sets of the closed pattern features to obtain a plurality of angle feature values and/or distance feature values in the actual pattern features in the first category image all-at-once, so as to effectively improve efficiency of the semiconductor component manufacturing process.

Figure 4A:
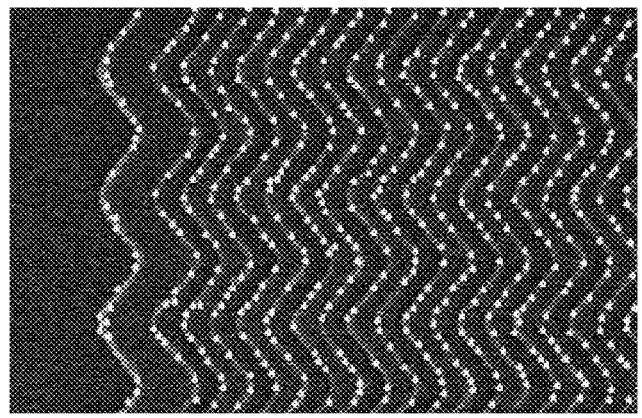
FIG. 4A is a SEM photograph of a second category image.
Figure 4B:
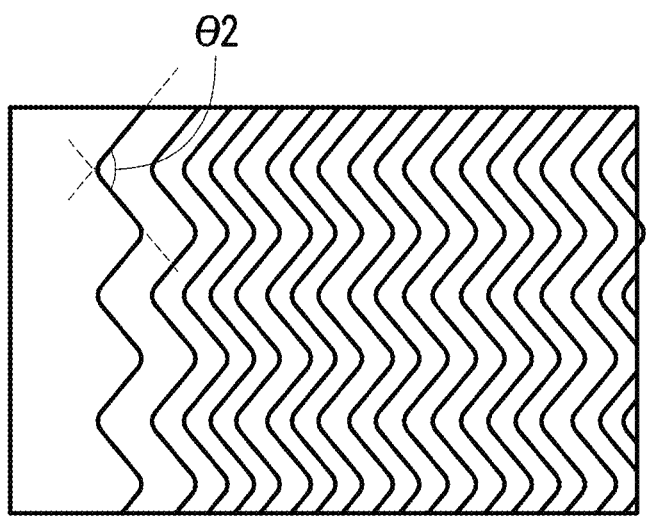
FIG. 4B is a schematic diagram of the second category image.

In another embodiment, if the feature values of the actual pattern feature in the second category image are calculated, a step S118 is executed as shown in FIG. 1, FIG. 4A and FIG. 4B to calculate the angle feature value of the actual pattern feature.

Referring to FIG. 1 and FIG. 4A, in the embodiment, the open pattern features of the second category image 400, for example, present curved wavy patterns, and the curved wavy patterns are arranged in a parallel manner. In other embodiments, the open pattern feature of the second category image 400 may also present other wire patterns, or the patterns are arranged in a different manner, which is not limited by the invention.

For example, the image recognition device compares the second category image 400 with the sub-images of the first category, i.e. to fit the boundaries or vertexes of the sub-images of the first category in the recognition result stored in the step S106 with the second category image 400 to obviously indicate the boundaries or vertexes of the open pattern features of the second category image 400, so as to replace the subjective judgment of engineers to avoid occurrence of a subjective judgment error.

Referring to FIG. 1 and FIG. 4B, the calculation unit in the image recognition device or the calculation unit externally connected to the image recognition device is adopted to calculate an angle between two adjacent boundaries or an angle presented by a vertex of the two connected boundaries to obtain the angle feature value θ2 of the open pattern feature of the second category image 400. In other embodiments, the image recognition device may simultaneously calculate a plurality sets of the open pattern features to obtain a plurality of angle feature values of the open pattern features all-at-once, so as to effectively improve efficiency of the semiconductor component manufacturing process. In the embodiment, the angle feature value θ2 is the recognition result of the pattern feature adapted to be applied to the OPC.

Figure 5:
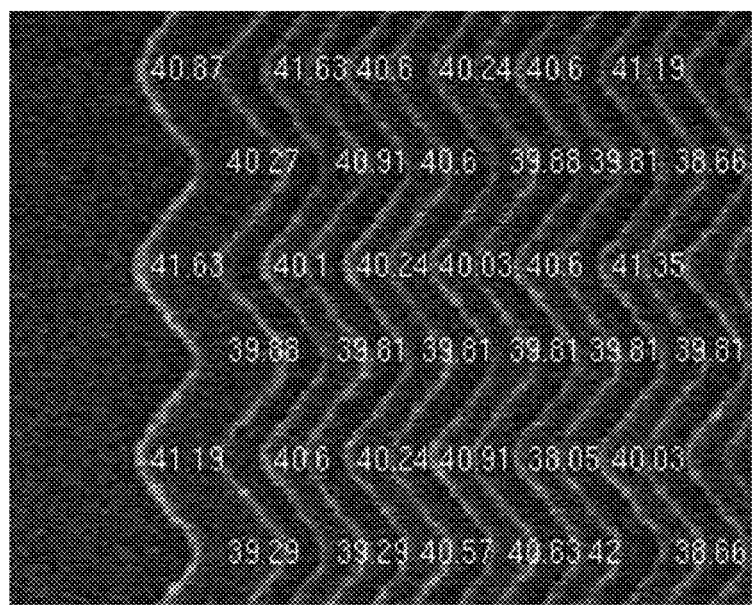
FIG. 5 is a SEM photograph of a recognition result of pattern features.

In an embodiment, the image recognition device may simultaneously calculate a plurality sets of angle feature values of the open pattern features in the second category image, and automatically indicate the angle feature values in the image as shown in FIG. 5.

In summary, in the invention, by using the image recognition device to calculate a plurality sets of angle feature values and/or distance feature values according to the classification result, occurrence of the subjective judgment error is avoided. Moreover, the plurality sets of angle feature values and/or distance feature values are applied to the OPC, and a compensation value required by the OPC is deduced based on the anti-trigonometric function to correct a pattern of an optical mask, so as to form the accurate pattern. In this way, occurrence of the subjective judgment error is avoided, so as to effectively improve the efficiency of the semiconductor component manufacturing process.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A recognition method of pattern feature, wherein a recognition result thereof is applied to optical proximity correction, the recognition method of pattern feature comprising:
providing a plurality of reference images with reference pattern features;
recognizing and classifying the reference images by an image recognition device, and storing the recognition result;
comparing an image with an actual pattern feature with the stored recognition result by the image recognition device to recognize and classify the image with the actual pattern feature; and
calculating an angle feature value and/or a distance feature value of the actual pattern feature by the image recognition device according to a classification result to obtain the recognition result of the pattern feature,
wherein the step of recognizing and classifying the reference images comprises dividing each of the reference images into a plurality of sub-images, and classifying the sub-images containing boundaries or vertexes of the reference pattern feature into a first category and classifying the other sub-images into a second category,
wherein the step of comparing and classifying the image with the actual pattern feature comprises comparing the image with the actual pattern feature with the sub-images of the first category by the image recognition device to recognize the image with the actual pattern feature, and classifying the image with the actual pattern feature that has closed pattern features into a first category image and classifying the image with the actual pattern feature that has open pattern features into a second category image.

2. The recognition method of pattern feature as claimed in claim 1, wherein the closed pattern feature comprises a hole pattern or an opening pattern, and the open pattern feature comprises a wire pattern.

3. The recognition method of pattern feature as claimed in claim 1, wherein a step of calculating feature values of the actual pattern feature in the first category image comprises:
finding a center of gravity of each of the closed pattern features;
calculating a distance between the center of gravities of two adjacent closed pattern features; and
calculating the angle feature value and the distance feature value according to the distance.

4. The recognition method of pattern feature as claimed in claim 3, wherein after the step of finding the center of gravity of each of the closed pattern features and before the step of calculating the distance, the recognition method of pattern feature further comprises:
calculating a slope of a connection line between the centers of gravity of two adjacent closed pattern features; and classifying the two adjacent closed pattern features with the slope of the connection line greater than 0 into a first group, and classifying the two adjacent closed pattern features with the slope of the connection line smaller than or equal to 0 into a second group, and the first group or the second group is selected to calculate the angle feature value and the distance feature value.

5. The recognition method of pattern feature as claimed in claim 1, wherein a step of calculating feature values of the actual pattern feature in the second category image comprises:

calculating the angle feature value of the actual pattern feature.

6. The recognition method of pattern feature as claimed in claim 1, wherein the reference images comprise images captured by a scanning electron microscope.

7. The recognition method of pattern feature as claimed in claim 1, wherein the image with the actual pattern feature comprises an image captured by a scanning electron microscope.

* * * * *